Nov. 26, 1963    H. L. LOXTERMAN    3,111,749
HANDLE APPLYING APPARATUS
Filed Sept. 26, 1960    2 Sheets-Sheet 1

INVENTOR
HOWARD L. LOXTERMAN
BY
ATTORNEY

United States Patent Office 3,111,749
Patented Nov. 26, 1963

3,111,749
HANDLE APPLYING APPARATUS
Howard L. Loxterman, 96 Pearl St., Painesville, Ohio
Filed Sept. 26, 1960, Ser. No. 58,309
2 Claims. (Cl. 29—235)

The present invention relates to an assembly tool, and more particularly to a tool for applying a plastic handle to a bottle or jug.

It is desirable in the bottling of milk in half-gallon jugs to provide a handle for ease in carrying said jug. Since the usual milk jug is provided with an outwardly flared lip portion, it is difficult to apply a ring over said lip and still maintain a tight fit between the ring and the neck of the jug whereby the ring and the handle forming a part thereof is securely held in position on the neck.

The present invention contemplates the provision of a stretchable ring formed of a plastic or the like material, said ring having a loop portion integrally formed therewith, which loop portion serves as a carrying handle for a jug to which the ring is applied. The present invention further contemplates a novel assembly tool for readily applying the ring to the neck of a jug.

Thus, the primary object of the present invention is to provide an assembly tool which is relatively simple in structure, easily operable, and highly efficient in assembling a handle on a jug or the like.

Other objects and advantages of the present invention will be apparent from the following detailed description when considered in conjunction with the accompanying drawing, wherein.

Figure 3:
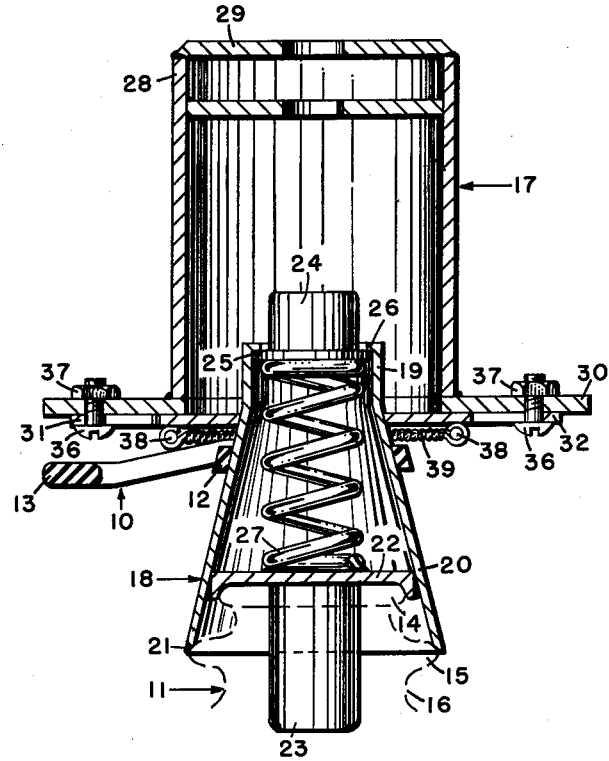
FIGURE 3 is a vertical sectional view through the assembly tool.

Referring to the drawings in detail, numeral 10 denotes a plastic handle adapted to be applied to a half-gallon milk jug 11 shown in dotted lines in FIGURE 3. The handle consists of a ring portion 12 and a carrying portion 13. The usual milk jug has the conventional lip portion 14 and a reinforcing rib 15 defining a reduced neck portion 16. The primary object of the present tool is to enlarge the ring portion of the handle to pass over the reinforcing rib and thereafter to contract whereby it lies over the neck portion 16 and retained against removal by the rib 15.

Figure 1:
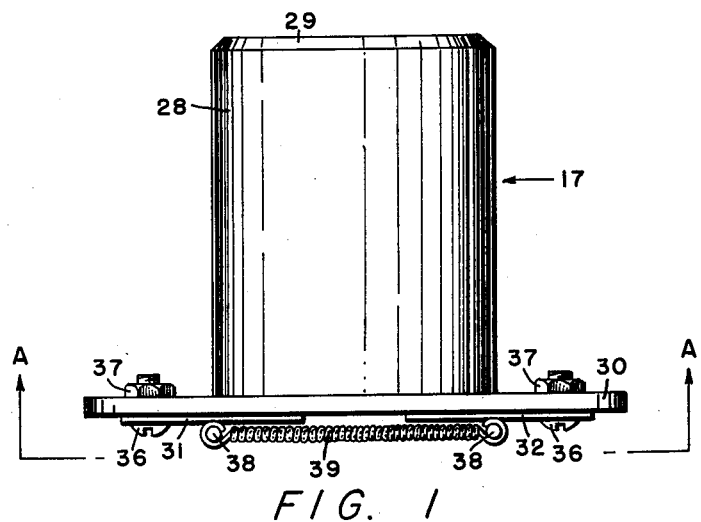
FIGURE 1 is a side elevation of the force applying portion of the assembly tool forming the subject matter of the present invention.
Figure 2:
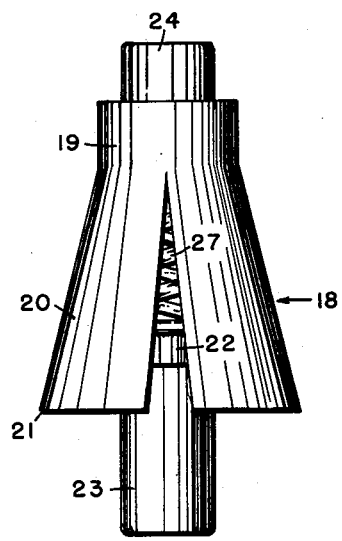
FIGURE 2 is a side elevation of the anvil portion of the present assembly tool.

The tool assembly comprises the two main parts shown in FIGURES 1 and 2 with numeral 17 denoting the force applying portion of the tool and numeral 18 denoting the anvil portion of the tool. The anvil portion 18 comprises a hollow member, the upper portion 19 of which is cylindrical and the lower portion 20 of which flares outwardly to form a frusto-conical section. The lower portion of the frusto-conical section is of a size to fit over the upper neck portion of a milk jug as seen in FIGURE 3. Spaced inwardly from the lower edge 21 of portion 20 and suitably secured to the inner surface thereof is a flanged plate 22 adapted to rest on the lip of the jug 11 for properly supporting the anvil on the jug. A centering plug 23 depends from and is suitably secured to the central portion of the plate 22. Protruding from the cylindrical portion 19 is a plunger 24, having an outwardly directed flange 25 cooperating with inwardly directed flange 26 to limit outward movement of the plunger 24.

A spring 27 is positioned between plate 22 and plunger 24 to return the plunger to its outermost position for a purpose which will appear as the description proceeds.

Figure 4:
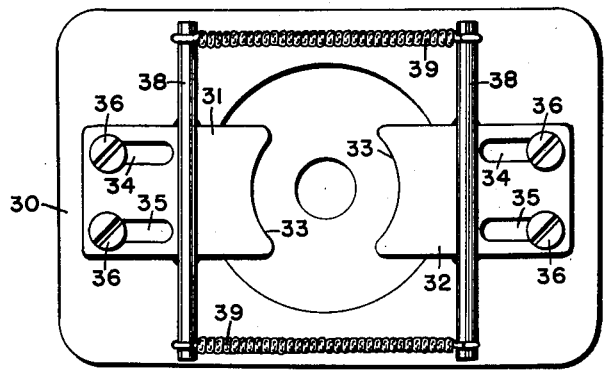
FIGURE 4 is a bottom plan view taken on the line A—A of FIGURE 1.

The force applying member 17 consists of a cylinder 28 open at its lower end and having a closure 29 affixed at its upper edge. Secured to the lower edge of the cylinder is a substantially rectangular plate 30 having an opening therein conforming to the open end of the cylinder. A pair of plate members 31, 32 are mounted for sliding movement on the lower surface of the plate 30. Each plate member is of substantially rectangular configuration having a curved edge 33, spaced slots 34, 35 and pass through openings formed in plate 30 for slidably retaining the plate members 31 and 32. The bolts are held in locked position by nuts 37. Each of the plates has affixed thereto a transverse bar 38 and the corresponding ends of each bar are connected to each other by springs 39, to enable the plates to return to their normal position as shown in FIGURE 4.

The operation of the assembly tool is as follows:

The anvil 18 is positioned on the open neck of a milk jug as seen in FIGURE 3. The ring portion 12 of the handle is dropped over the cylindrical portion 19 and rests on the upper portion of skirt 20. The force applying tool is then positioned over the anvil and in this position, the curved sides of the slidable plates 31 and 32 bear against the flared portion 20 directly above the ring 12. As tool 17 is forced downwardly the plates 31, 32 press ring 12 downwardly and expands said ring until is passes the lower edge 21 of skirt 20, at which time the ring contracts and is locked below rib 15. During downward movement of the tool, plunger 24 moves downwardly causing contraction of the spring 27. Upon release of the downward force or pressure, spring 27 expands to its normal state, thus raising the force applying tool and freeing it from the anvil.

The form of the invention shown and described is intended to be taken as a preferred example of the same, and various changes in size, shape and arrangement of parts may be made as do not depart from the spirit of the invention and the scope of the appended claims.

Having thus described the invention, what is claimed as new is as follows:

1. Apparatus for assemblying a stretchable annular member on the neck portion of a container or the like comprising an anvil having a frusto-conical portion open at its lower end and adapted to fit over the neck portion of a container, a plate secured within the open end of the frusto-conical portion and spaced from the lower edge thereof, said plate adapted to rest upon the upper edge of the container, said anvil having an upper cylindrical portion, a plunger extending from the upper end of said cylindrical portion, and a compression spring interposed between said plunger and said plate, a force applying member having an open end for receiving a portion of said anvil, and slidable plates on said member for contacting said frusto-conical member whereby downward movement of said force applying member will retract said plates during said movement, said plates being adapted to move said annular member onto the neck portion of the container.

2. Apparatus for assembling a stretchable annular member on the neck portion of a container or the like comprising an anvil having a frusto-conical portion open at its lower end and adapted to fit over the neck portion of a container, a plate secured within the open end of the frusto-conical portion and spaced from the lower edge thereof, said plate adapted to rest upon the upper edge of the container, said anvil having an upper cylindrical portion, a plunger extending from the upper end of said cylindrical portion, and a compression spring interposed between said plunger and said plate, a force applying member having an open end for receiving a portion of said anvil, slidable plates on said member for contacting said frusto-conical member whereby downward movement of said force applying member will retract said plates during said movement, said plates being adapted to move said annular member onto the neck portion of the container, and spring means connecting said sliding plates for retracting said plates upon release from the anvil.

References Cited in the file of this patent

UNITED STATES PATENTS

| | | |
|---|---|---|
| 2,263,690 | Bradley | Nov. 25, 1941 |
| 2,263,778 | Howard | Nov. 25, 1941 |